United States Patent [19]

Harvey

[11] 4,201,098
[45] May 6, 1980

[54] TRANSMISSION

[75] Inventor: James R. Harvey, Cedar Falls, Iowa

[73] Assignee: Deere & Company, Moline, Ill.

[21] Appl. No.: 910,394

[22] Filed: May 30, 1978

Related U.S. Application Data

[63] Continuation of Ser. No. 735,379, Oct. 26, 1976, abandoned.

[51] Int. Cl.² ............................................. F16H 57/10
[52] U.S. Cl. .................................................... 74/761
[58] Field of Search ................. 74/753, 758, 759, 760, 74/761, 763, 768, 769, 740

[56] References Cited

U.S. PATENT DOCUMENTS

| | | | |
|---|---|---|---|
| 3,298,252 | 1/1967 | Harris et al. | 74/761 |
| 3,381,546 | 5/1968 | Holl | 74/761 |

Primary Examiner—C. J. Husar
Assistant Examiner—Frank McKenzie

[57] ABSTRACT

A planetary transmission for selectively shifting among six forward speeds and two reverse speeds includes a single planet carrier carrying four planet gear sets and clutchable to a drive shaft. First and second planet gear sets mesh respectively with first and second sun gears secured to the drive shaft and with encircling brake-associated first and second ring gears. A third planet gear set meshes with a centrally apertured third sun gear and with an encircling brake-associated third ring gear. A fourth planet gear set meshes with the third planet gear set and with a fourth sun gear secured to a driven shaft which extends through the central aperture of the third sun gear and which is clutchable to the third sun gear.

12 Claims, 3 Drawing Figures

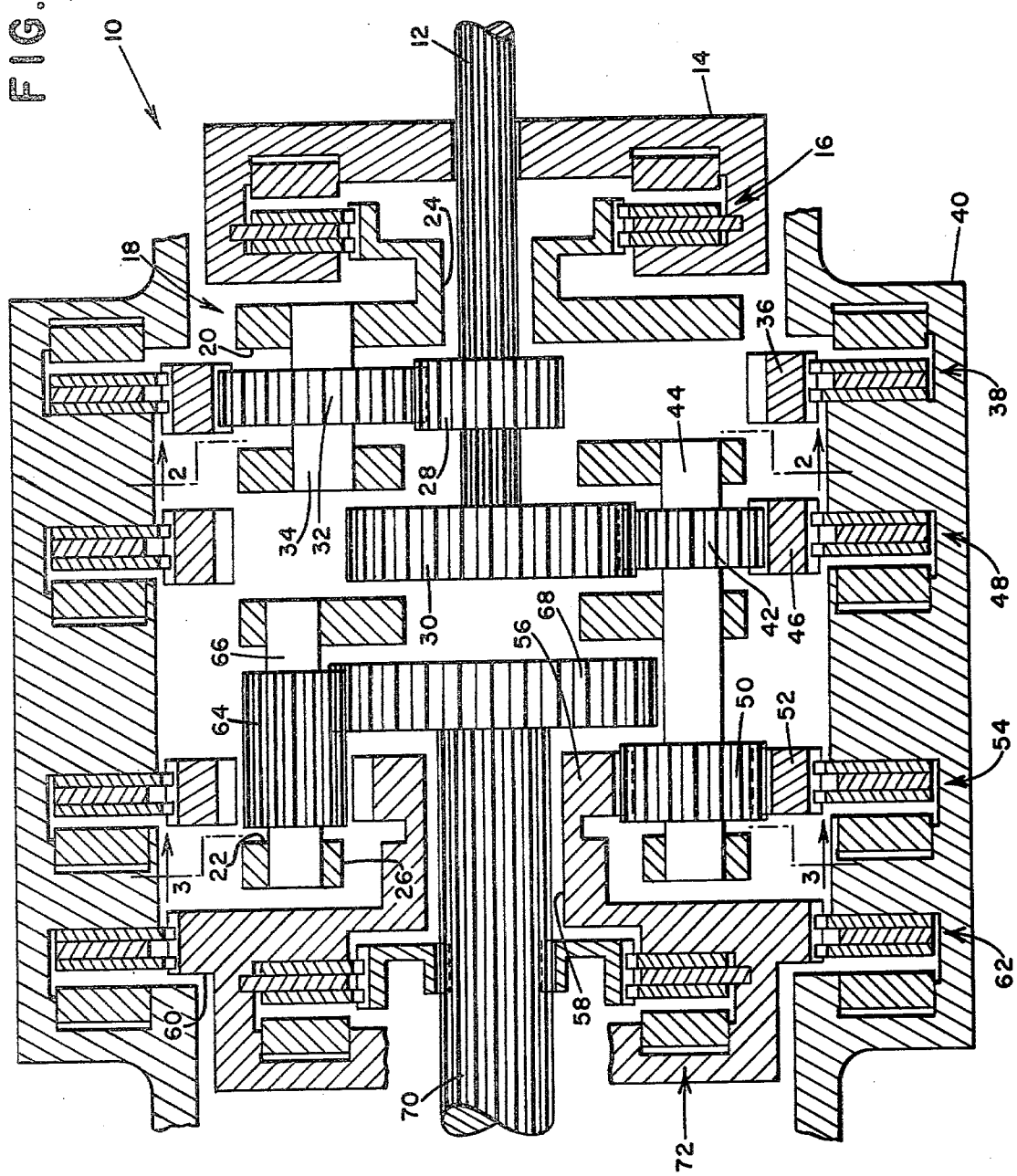

TRANSMISSION

CROSS REFERENCE TO RELATED APPLICATION

This is a continuation of U.S. application Ser. No. 735,379, filed Oct. 26, 1976, now abandoned.

BACKGROUND OF THE INVENTION

The present invention relates generally to vehicle power shift transmissions and more particularly to a planetary transmission which is capable of being shifted between six forward speeds and two reverse speeds.

In the past, a relatively complex system for gears, brakes, and clutches were required in order to provide a large number of speed ratios as shown in the U.S. Pat. No. 3,298,252 granted to K. J. Harris et al which provided eight forward and four reverse speeds. With further development fo planetary transmissions, simple arrangements have been devised such as that shown in the U.S. Pat. No. 3,381,546 granted to H. H. Holl; however, with simplification, the number of speed ratios has been decreased, for example with the Holl transmission only four forward and three reverse speeds are available.

SUMMARY OF THE INVENTION

The present invention provides a six forward and two reverse speed planetary transmission requiring a minimum number of gears, brakes, and clutches. A drive shaft is provided which is clutchable for driving a common planet carrier in the transmission. Two sun gears are mounted on the drive shaft and mesh with two planet gear sets mounted in the carrier. The two planet gear sets each mesh with a brake-associated ring gear to selectively drive the carrier. Two other meshing planet gear sets in the carrier mesh respectively with brake-associated and output shaft-associated sun gears which are clutchable together to be driven by the carrier and which are unclutchable to allow the driven-shaft-associated sun gear to be driven by the meshing planet gear sets.

BRIEF DESCRIPTION OF THE DRAWINGS

FIG. 1 is a diagammatic longitudinal view, partially in section, of the planetary transmission of the present invention;

DESCRIPTION OF THE PREFERRED EMBODIMENT

Figure 3:
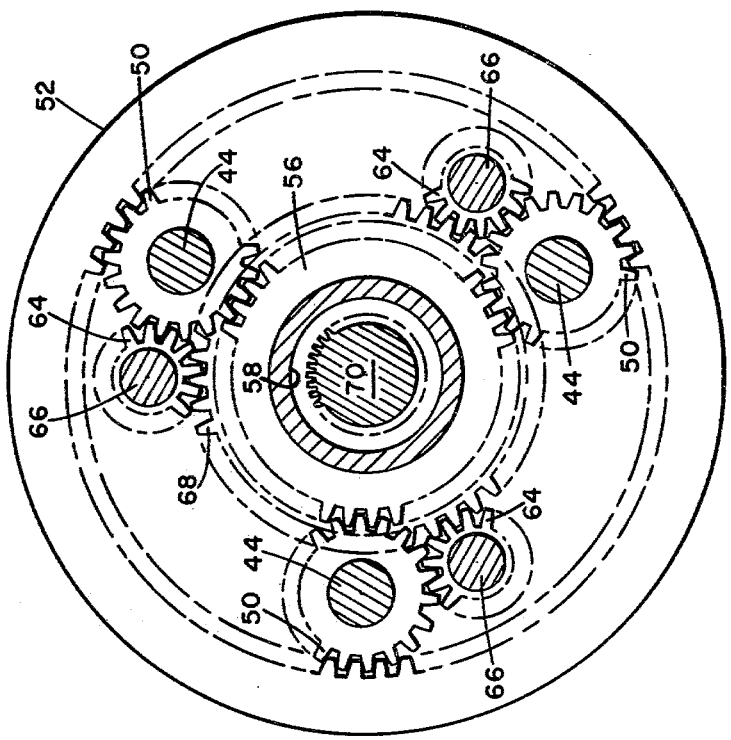
FIG. 3 is a cross-sectional view taken along the line 3—3 of FIG. 1.

Referring now to FIG. 1, therein is shown a planetary transmission generally designated by the numeral 10. The transmission 10 is driven by a drive shaft 12 which is generally connected to an internal combustion engine (not shown). The drive shaft 12 is splined to an input hub 14 which includes a first clutch 16 having conventional clutch components. The first clutch 16 is clutchable to couple the input hub 14 to a common planet carrier generally designated by the numeral 18 which is positioned rearwardly of the input hub 14. The expression "rearwardly" is used on the basis of a typical fore and aft disposition of the transmission in a vehicle; however, it will be realized that such an expression is used for purposes of convenience and not by way of limitation.

The planet carrier 18 is relatively long in fore and aft extension and has front and rear walls 20 and 22, respectively, coaxially apertured at 24 and 26, respectively. The planet carrier 18 has means rigidly interconnecting the front and rear walls 20 and 22, and this means includes several shafts, for carrying planet gears to be hereinafter described, together with circumferentially spaced wall portions.

The drive shaft 12 extends through the aperture 24 in the fron wall 20 of the planet carrier 18 and has secured thereto a first sun gear 28 and rearwardly therefrom a second sun gear 30.

Figure 2:
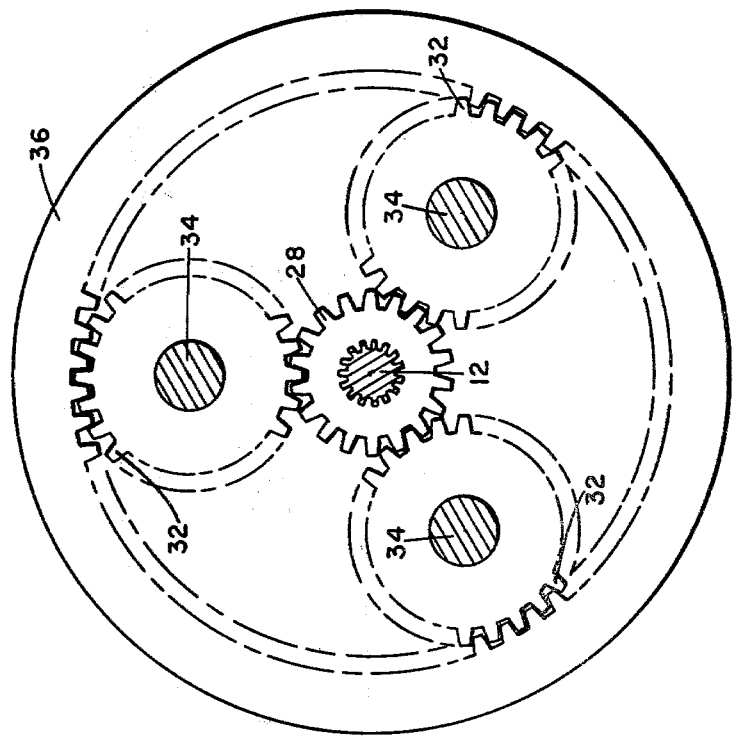
FIG. 2 is a cross-sectional view taken along the line 2—2 of FIG. 1.

The first sun gear 29 meshes with a first planet gear set 32 which consists of three gears as shown in FIG. 2 and which are bearing-mounted on a set of three equilaterally spaced first shafts 34. The first shafts 34 are rigidly secured to the planet carrier 18 so as to allow the first planet gear set 32 to protrude from the planet carrier 18 and mesh with a first ring gear 36. The first ring gear 36 concentrically encircles the first sun gear 28 and is floatingly carried by the first planet gear set 32. The first ring gear 36 is associated with a first brake 38 having conventional components which allow the first ring gear 36 to be selectively braked and released relative to a transmission housing 40.

The second sun gear 30 meshes with a second planet gear set 42 which is similar to the first planet gear set 32 in consisting of three gears which are bearing-mounted on a set of three equilaterally spaced second shafts 44. Only one second planet gear 42 and one second shaft 44 is shown in the drawings. The second shafts 44 are rigidly secured to the planet carrier 18 and positioned so as to allow the second planet gear set 42 to protrude therefrom to engage a second ring gear 46. The second ring gear 46 concentrically encircles the second sun gear 30 and is floatingly carried by the second planet gear set 42. The second ring gear 46 is associated with a second brake 48 having conventional components for selectively braking and releasing the second ring gear 46 relative to the transmission housing 40.

The second shaft set 44 extends rearwardly from the second planet gear set 42 into the rear wall 22 of the planet carrier 18. On the second shaft set 44, just forwardly of the rear wall 22 are bearing-mounted the gears of a third planet gear set 50 which consists of three equilaterally spaced gears as shown in FIG. 3.

The third planet gear set 50 protrudes from the planet carrier 18 to mesh with a third ring gear 52. The third ring gear 52 concentrically encircles a third sun gear 56 and is floatingly carried by the third planet gear set 50. The third ring gear 52 is associated with a third brake 54 having conventional components for selectively braking and releasing the third ring gear 52 relative to the transmission housing 40. The third planet gear set 50 further meshes with the centrally apertured third sun gear 56. The third sun gear 56 is connected by a hollow intermediate portion 58 to a third sun gear hub 60 which is associated with a fourth brake 62 having conventional components for selectively braking and releasing the third sun gear 56 relative to the transmission housing 40.

The third planet gear set 50 still further meshes with a fourth planet gear set 64 consisting of three gears which are bearing-mounted on a set of three equilaterally spaced third shafts 66 so as to not protrude from the planet carrier 18. The fourth planet gear set 64 meshes with a fourth sun gear 68 forward of the third sun gear 56. The fourth sun gear 68 is secured to a driven shaft 70 which extends rearwardly from the planet carrier 18 through the centrally apertured third sun gear 56 and the hollow intermediate portion 58 to the exterior of the transmission housing 40. Just rearwardly of the third sun gear hub 60 is secured a second clutch 72 having conventional components for selectively coupling and uncoupling the third sun gear hub 60 and the driven shaft 70; i.e. coupling and uncoupling the third and fourth sun gears 56 and 58.

From the description thus far, and noting that drive shaft 12 may be connected to a power source such as an internal combustion engine by a clutch or other torque transmitting mechanism, it will be seen that the drive shaft 12 may be regarded as a constantly rotating part.

A first forward speed is obtained by braking the first brake 38 and the second clutch 72. The rotation of the drive shaft 12 is transmitted through the first sun gear 28 to the first planet gear set 32 which is forced to translate because the first ring gear 36 is braked by the first brake 38. The translation of the first planet gear set 32 causes rotation of the planet carrier 18. The rotation of the planet carrier 18 is transmitted through the third and fourth planet gears 50 and 64 to the third and fourth sun gears 56 and 64 which are prevented from rotating relative to one another due to the engagement of the second clutch 72 which causes the driven shaft 70 to rotate at the same speed as the planet carrier 18.

A second forward speed is obtained by braking the second brake 48 while the second clutch 72 remains engaged. The rotation of the drive shaft 12 is then transmitted through the second sun gear 30 to the second planet gear set 42 which is forced to translate since the second ring gear 46 is braked by the second brake 48. The translation of the second planet gear 42 causes rotation of the planet carrier 18 at a speed different from that in the first forward speed. Since the second clutch 72 is engaged the driven shaft 70 will again rotate at the same speed as the planet carrier 18.

A third forward speed is obtained by braking the first brake 38 and the fourth brake 62. The rotation of the drive shaft 12 is transmitted through the first sun gear 28 to the first planet gear set 32 which is forced to translate because of the first ring gear 36 is held by the first brake 38. The translation of the first planet gear set 32 causes rotation of the planet carrier 18 and thus translation of the third planet gear set 50. With the fourth brake 62 braking the third sun gear hub 60 and therefore the third sun gear 56, the translation of the third planet gear set 50 around the third sun gear 56 causes rotation of the third planet gear set 50. The rotation of the third planet gear set 50 is transmitted through the fourth planet gear set 64 to the fourth sun gear 69 and thence to the driven shaft 70.

A fourth forward speed is obtained by braking the second brake 48 and the fourth brake 62. The rotation of the drive shaft 12 is then transmitted through the second sun gear 30 to the second planet gear set 42 which translates because the second ring gear 46 is braked by the second brake 48. The translation of the second planet gear set 42 causes rotation of the planet carrier 18 which causes translation of the third planet gear set 50. The third planet gear set 50 rotates because the third sun gear 56 is braked by the fourth brake 62 and the rotation of the third planet gear set 50 is transmitted through the fourth planet gear set 64 to the fourth sun gear 68 and thence to the driven shaft 70.

A fifth forward speed is obtained by clutching the first and second clutches 16 and 72. The rotation of the drive shaft 12 is transmitted through the first clutch 16 to the planet carrier 18 and thence through the second clutch 72 into the driven shaft 70 so as to provide a direct mechanical drive from the drive shaft 12 to the driven shaft 70.

A sixth forward speed may be obtained by clutching the first clutch 16 and braking the fourth brake 62. The rotation of the drive shaft 12 is transmitted through the first clutch 16 to the planet carrier 18 to cause translation of the third planet gear set 50 and rotation thereof since the third sun gear 56 is braked by the fourth brake 62. The rotation of the third planet gear set 50 is transmitted through the fourth planet gear set 64 to the fourth sun gear 68 and thence to the driven shaft 70.

A first reverse speed is obtained by braking the first and third brakes 38 and 54. The rotation of the drive shaft 12 is transmitted through the first sun gear 28 to the first planet gear set 32 which is forced to translate and cause rotation of the planet carrier 18 since the first ring gear 36 is braked by the first brake 38. The rotation of the planet carrier 18 causes translation of the third planet gear set 50 which rotates in an opposite direction from that of the forward speeds since the third ring gear 52 is braked by the third brake 54. The reverse rotation of the third planet gear set 50 is transmitted through the fourth planet gear set 64 to the fourth sun gear 68 and thence to the driven shaft 70 to cause rotation thereof at a first reverse speed.

A second reverse speed is obtained by braking the second and third brakes 48 and 54. The rotation of the drive shaft 12 is transmitted through the second sun gear 30 to the second planet gear set 42 which is forced to translate and rotate the planet carrier 18 due to the braking of the second ring gear 46 by the second brake 48. The translation of the planet carrier 18 causes translation of the third planet gear set 50 and reverse rotation thereof due to the third ring gear 52 being braked by the third brake 54. The reverse rotation of the third planet gear set 50 is transmitted through the fourth planet gear set 64 to the fourth sun gear 68 and thence to the driven shaft 70 to cause rotation thereof at a second reverse speed.

While the invention has been described in conjunction with a specific embodiment, it is to be understood that many alternatives, modifications, and variations will be apparent to those skilled in the art in light of the aforgoing description. Accordingly, it is intended to embrace all such alternatives, modifications, and variations which fall within the spirit and scope of the appended claims.

I claim:

1. A transmission comprising: a drive shaft; a driven shaft; first, second, and third axially spaced planetary units have a rotatable common planet carrier spanning the shafts; said first planetary unit including a first sun gear secured to the drive shaft, a first rotatable ring gear surrounding the first sun gear, and a first planet gear journaled in the planet carrier meshing with the first sun gear and the first ring gear; first brake means for selectively braking and releasing the first ring gear; first clutch means for selectively coupling the planet carrier and the drive shaft together; said second planetary unit including a second sun gear secured to the drive shaft axially spaced from the first sun gear, a second rotatable ring gear surrounding the second sun gear, and a second planet gear journaled in the planet carrier for rotation relative to the first planet gear meshing with the second sun gear and the second ring gear; second brake means for selectively braking and releasing the second ring gear; said third planetary unit including a third and fourth relatively rotatable gun gears, a third ring gear surrounding said third sun gear, a third planet gear journaled in the planet carrier meshing with the third sun gear and the third ring gear, and a fourth planet gear journaled in the planet carrier meshing with the third planet gear and the fourth sun gear; third brake means for selectively braking and releasing the third ring gear; fourth brake means for selectively braking and releasing the third sun gear; second clutch means for selectively coupling the third and fourth sun gears together whereby the driven shaft is rotatable at six different forward ratios when the first, second, and fourth brakes are selectively braked and released and the first and second clutches are selectively coupled and released and whereby the driven shaft is rotatable at two different reverse ratios when the first and second brakes are alternately braked and released with the third brake braked.

2. The transmission as claimed in claim 1 wherein the second planetary unit is coaxially behind the first planetary unit and the fourth sun gear is located ahead of the third sun gear and rearwardly of the first and second sun gears, the third sun gear is axially hollow and the driven shaft extends coaxially therethrough and is connected to the fourth sun gear, and the fourth brake means includes a hollow portion coaxially surrounding the driven shaft and coaxially connected to the third sun gear.

3. The transmission as claimed in claim 1 wherein the drive shaft, the planet carrier, and the driven shaft are coaxial on a fore and aft axis, the second sun gear is spaced rearwardly of the first sun gear, the first clutch means is secured to the drive shaft ahead of the first sun gear, and the second clutch means is secured to the driven shaft behind the third sun gear.

4. The transmission as claimed in claim 3 wherein the third sun gear is axially hollow and is spaced rearwardly from the fourth sun gear, the fourth brake means includes a hollow intermediate portion coaxially connected to and extending rearwardly from said third sun gear, and said fourth sun gear is coaxially between the second and third sun gears and is secured to the driven shaft which extends rearwardly through said hollow intermediate portion.

5. A transmission comprising: a drive shaft; a driven shaft; first, second, and third axially spaced planetary units having a rotatable common planet carrier spanning the shafts; said first planetary unit including a first driven gear secured to the drive shaft, a first rotatable reaction gear surrounding the first driven gear, and a first planet gear journaled on the planet carrier meshing with the first driven gear and the first reaction gear; first brake means for selectively braking and releasing the first reaction gear; first clutch means for selectively coupling the planet carrier and the drive shaft together; said second planetary unit including a second driven gear secured to the drive shaft axially spaced from the first driven gear, a second rotatable reaction gear surrounding the second driven gear, and a second planet gear journaled in the planet carrier for rotation relative to the first planet gear meshing with the second driven gear and the second reaction gear; second brake means for selectively braking and releasing the second reaction gear; said third planetary unit including a third and fourth relatively rotatable driven gears, a third reaction gear surrounding said third driven gear, a third planet gear journaled in the planet carrier meshing with the third driven gear and the third reaction gear, and a fourth planet gear journaled in the planet carrier meshing with the third planet gear and the fourth driven gear; third brake means for selectively braking and releasing the third reaction gear; fourth brake means for selectively braking and releasing the third driven gear; second clutch means for selectively coupling the third and fourth driven gears together whereby the driven shaft is rotatable at six different forward ratios when the first, second, and fourth brakes are selectively braked and released and the first and second clutches are selectively coupled and released and whereby the driven shaft is rotatable at two different reverse ratios when the first and second brakes are alternately braked and released with the third brake braked.

6. A planetary transmission comprising: a single carrier rotatable on a fore and aft axis and having spaced apart, centrally apertured front and rear walls and means rigidly interconnecting said walls and having openings therein exposing the interior of said carrier radially outwardly; a first sun gear within the carrier just behind the front wall; a second sun gear coaxial with the first sun gear within the carrier just rearwardly of said first sun gear; first and second relatively rotatable ring gears encircling the carrier and respectively concentric with the first and second sun gears; first and second planet gears journaled in the carrier for relative rotation with respect to each other meshing respectively with said first and second sun gears and with said first and second ring gears via at least one of the aforesaid openings; a centrally apertured third sun gear separate rate from the other sun gears and disposed within the carrier ahead of said rear wall and spaced rearwardly from said second sun gear; a fourth sun gear separate from the other sun gears and disposed within the carrier intermediate the second and third sun gears, a third rotatable ring gear encircling the carrier in concentric relation to the third sun gear; a third planet gear journaled in the carrier meshing with the third sun gear and in mesh with the third ring gear via at least one of the aforesaid openings; a fourth planet gear journaled in the carrier meshing with the third planet gear and the fourth sun gear; drive shaft extending through the carrier front wall secured to the first and second sun gears; a hollow intermediate shaft extending coaxially through the carrier wall and fixed to the third sun gear; and driven shaft extending axially through the intermediate shaft and fixed to the fourth sun gear.

7. A transmission comprising: a drive shaft; a driven shaft; first, second, and third axially spaced planetary units having a rotatable common planet carrier spanning the shafts; said first planetary unit including a first sun gear secured to the drive shaft, a first rotatable ring gear surrounding the first sun gear, and a first planet gear journaled in the planet carrier meshing with the first sun gear and the first ring gear; first brake means for selectively braking and releasing the first ring gear; first clutch means secured to the drive shaft for selectively clutching the planet carrier directly to the drive shaft; said second planetary unit including a second sun gear secured to the drive shaft axially spaced from the first sun gear for common rotation with the first sun gear, a second rotatable ring gear surrounding the second sun gear, and a second planet gear journaled in the planet carrier independent of and offset from the first planet gear meshing with the second sun gear and the second ring gear; second brake means for selectively braking and releasing the second ring gear; said third planetary unit including a third and fourth relatively rotatable sun gears, a third ring gear surrounding said third sun gear, a third planet gear journaled in the planet carrier meshing with the third sun gear and the third ring gear, and a fourth planet gear journaled in the planet carrier meshing with the third planet gear and the fourth sun gear; third brake means for selectively braking and releasing the third ring gear; fourth brake means for selectively braking and releasing the third sun gear; second clutch means for selectively coupling the third and fourth sun gears together whereby the driven shaft is rotatable at six different forward ratios when the first, second, and fourth brakes are selectively braked and released and the first and second clutches are selectively coupled and released and whereby the driven shaft is rotatable at two different reverse ratios when the first and second brakes are alternately braked and released with the third brake braked.

8. The transmission as claimed in claim 7 wherein the second planetary unit is coaxially behind the first planetary unit and the fourth sun gear is located ahead of the third sun gear and rearwardly of the first and second sun gears, the third sun gear is axially hollow and the driven shaft extends coaxially therethrough and is connected to the fourth sun gear, and the fourth brake means includes a hollow portion coaxially surrounding the driven shaft and coaxially connected to the third sun gear.

9. The transmission as claimed in claim 7 wherein the drive shaft, the planet carrier, and the driven shaft are coaxial on a fore and aft axis, the second sun gear is spaced rearwardly of the first sun gear, the first clutch means is secured to the drive shaft ahead of the first sun gear, and the second clutch means is secured to the drive shaft behind the third sun gear.

10. The transmission as claimed in claim 9 wherein the third sun gear is axially hollow and is spaced rearwardly from the fourth sun gear, the fourth brake means includes a hollow intermediate portion coaxially connected to and extending rearwardly from said third sun gear, and said fourth sun gear is coaxially between the second and third sun gears and is secured to the driven shaft which extends rearwardly through said hollow intermediate portion.

11. A transmission comprising: a drive shaft; a driven shaft; first, second, and third axially spaced planetary units having a rotatable common planet carrier spanning the shafts; said first planetary unit including a first driven gear secured to the drive shaft, a first rotatable reaction gear surrounding the first driven gear, and a first planet gear journaled on the planet carrier meshing with the first driven gear and the first reaction gear; first brake means for selectively braking and releasing the first reaction gear; first clutch means secured to the drive shaft for selectively clutching the planet carrier directly to the drive shaft; said second planetary unit including a second driven gear secured to the drive shaft axially spaced from the first driven gear for common rotation with the first driven gear, a second rotatable reaction gear surrounding the second driven gear, and a second planet gear journaled in the planet carrier independent of and offset from the first planet gear meshing with the second driven gear and the second reaction gear; second brake means for selectively braking and releasing the second reaction gear; said third planetary unit including a third and fourth relatively rotatable driven gears, a third reation gear surrounding said third driven gear, a third planet gear journaled in the planet carrier meshing with the third driven gear and the third reaction gear, and a fourth planet gear journaled in the planet carrier meshing with the third planet gear and the fourth driven gear; third brake means for selectively braking and releasing the third reaction gear; fourth brake means for selectively braking and releasing the third driven gear; second clutch means for selectively coupling the third and fourth driven gears together whereby the driven shaft is rotatable at six different forward ratios when the first, second, and fourth brakes are selectively braked and released and the first and second clutches are selectively coupled and released and whereby the driven shaft is rotatable at two different reverse ratios when the first and second brakes are alternately braked and released with the third brake braked.

12. A planetary transmission comprising: a single carrier rotatable on a fore and aft axis and having spaced apart, centrally apertured front and rear walls and means rigidly interconnecting said walls and having openings therein exposing the interior of said carrier radially outwardly; a first sun gear within the carrier just behind the front wall; a second sun gear coaxial with the first sun gear within the carrier just rearwardly of said first sun gear and connected thereto for common rotation therewith; first and second relatively rotatable ring gears encircling the carrier and respectively concentric with the first and second sun gears; first and second planet gears journaled in the carrier for relative rotation relative to one another meshing respectively with said first and second sun gears and with the first and second ring gears via at least one of the aforesaid openings; a centrally apertured third sun gear separate from the other sun gears and disposed within the carrier ahead of said rear wall and spaced rearwardly from said second sun gear; a fourth sun gear separate from the other sun gears and disposed within the carrier intermediate the second and third sun gears, a third rotatable ring gear encircling the carrier in concentric relation to the third sun gear; a third planet gear journaled in the carrier meshing with the third sun gear and in mesh with the third ring gear via at least one of the aforesaid openings; a fourth planet gear journaled in the carrier meshing with the third planet gear and the fourth sun gear; a single drive shaft extending through the carrier front wall having the first and second sun gears secured thereto; a hollow intermediate shaft extending coaxially through the carrier wall and fixed to the third sun gear; and driven shaft extending axially through the intermediate shaft and fixed to the fourth sun gear.

* * * * *